(12) United States Patent
Miyata et al.

(10) Patent No.: US 10,218,495 B2
(45) Date of Patent: Feb. 26, 2019

(54) SECURE COMPUTATION METHOD, SECURE COMPUTATION SYSTEM, SECURE COMPUTATION SERVER, REGISTRANT TERMINAL, USER TERMINAL AND PROGRAM

(71) Applicant: NIPPON TELEGRAPH AND TELEPHONE CORPORATION, Chiyoda-ku (JP)

(72) Inventors: Teruko Miyata, Musashino (JP); Hiroyoshi Takiguchi, Musashino (JP); Naoto Kiribuchi, Musashino (JP); Koji Chida, Musashino (JP); Dai Ikarashi, Musashino (JP); Gembu Morohashi, Musashino (JP); Hitoshi Fuji, Musashino (JP); Shigeru Kayaguchi, Musashino (JP)

(73) Assignee: NIPPON TELEGRAPH AND TELEPHONE CORPORATION, Chiyoda-ku (JP)

( * ) Notice: Subject to any disclaimer, the term of this patent is extended or adjusted under 35 U.S.C. 154(b) by 135 days.

(21) Appl. No.: 15/110,645

(22) PCT Filed: Dec. 5, 2014

(86) PCT No.: PCT/JP2014/082220
§ 371 (c)(1),
(2) Date: Jul. 8, 2016

(87) PCT Pub. No.: WO2015/114947
PCT Pub. Date: Aug. 6, 2015

(65) Prior Publication Data
US 2016/0330018 A1    Nov. 10, 2016

(30) Foreign Application Priority Data
Jan. 28, 2014 (JP) .................................. 2014-013081

(51) Int. Cl.
*G06F 12/14* (2006.01)
*H04L 9/06* (2006.01)
(Continued)

(52) U.S. Cl.
CPC ............ *H04L 9/0625* (2013.01); *G06F 21/45* (2013.01); *H04L 9/00* (2013.01); *H04L 9/0863* (2013.01);
(Continued)

(58) Field of Classification Search
None
See application file for complete search history.

(56) References Cited

U.S. PATENT DOCUMENTS 6,959,394 B1 * 10/2005 Brickell .............. G06Q 20/206
380/44

OTHER PUBLICATIONS

Japanese Office Action dated Apr. 11, 2017 in Patent Application No. 2015-559767 (with English Translation).
(Continued)

*Primary Examiner* — Brandon S Hoffman
(74) *Attorney, Agent, or Firm* — Oblon, McClelland, Maier & Neustadt, L.L.P.

(57) ABSTRACT

Data processing is performed while personal information is kept concealed. A registrant terminal splits a registration input password and allocates the split pieces to secure computation servers. The secure computation servers verify whether the password matches. The registrant terminal splits target data and allocates the data shared values to the secure computation servers. The secure computation servers store the data shared values. A user terminal splits a utilization input password and allocates the split pieces to the secure computation servers. The secure computation servers verify whether the password matches. The user terminal sends a data processing request to the secure computation servers.
(Continued)

SECURE COMPUTATION SYSTEM

The secure computation servers execute secure computation of the data shared values to generate processing result shared values. The user terminal recovers the processing result from the processing result shared values.

7 Claims, 6 Drawing Sheets

(51) Int. Cl.
  *H04L 9/00* (2006.01)
  *G06F 21/45* (2013.01)
  *H04L 9/08* (2006.01)
  *H04L 9/32* (2006.01)
(52) U.S. Cl.
  CPC ........ *H04L 9/3226* (2013.01); *H04L 2209/46* (2013.01)

(56) References Cited

OTHER PUBLICATIONS

Office Action dated Dec. 20, 2016 in Japanese Patent Application No. 2015-559767 (with English translation).
Gembu Morohashi, et al., "Secure Authentication Protocol for Practical Multi-Party computation/Secret Sharing Scheme Systems", SCIS 2013, The $30^{th}$ Symposium on Cryptography and Information Security, 2013, pp. 1-8 and 1 page of English Summary.
Koki Hamada, et al., "MEVAL: A Practically Efficient System for Secure Multi-party Statistical Analysis", Computer Security Symposium 2013, pp. 777-784 (with English abstract).
Office Action dated Dec. 19, 2017 in Japanese Patent Application No. 2015-559767 (with English language translation).
Extended European Search Report dated Sep. 12, 2017 in Patent Application No. 14881321.5.
Taekyoung Kwon, "Virtual Software Tokens—A Practical Way to Secure PKI Roaming", In: "Network and Parallel Computing", Springer International Publishing, Cham 032548, vol. 2437, XP55397041, Jan. 1, 2002, pp. 288-302.
Jan Camenisch et al., "Practical Yet Universally Composable Two-Server Password-Authenticated Secret Sharing", International Association for Cryptologic Research, vol. 20121227:172803, XP61007071, Dec. 21, 2012, pp. 1-27.
Gembu Morohashi, et al. "Statistical Analysis System for Clinical Study Using Secure Multi-party Computation", Computer Security Symposium, pp. 533-538, (Oct. 30-Nov. 1, 2012), (with English Abstract).
Dan Bogdanov, et al, "High-performance secure multi-party computation for data mining applications", International Journal of Information Security, vol. 11, Issue 6, pp. 403-418, (2012).
Martin Burkhart, et al., "SEPIA: Privacy-Preserving Aggregation of Multi-Domain Network Events and Statistics", USENIX Security, Total 17 Pages, (2010).
Raluca Ada Popa, et al., "CryptDB: Protecting Confidentiality with Encrypted Query Processing", SOSP '11 Proceedings of the Twenty-Third ACM Symposium on Operating Systems Principles, Total 16 Pages, (2011).
Craig Gentry, "Fully Homomorphic Encryption Using Ideal Lattices", STOC '09 Proceedings of the $41^{st}$ Annual ACM Symposium on Theory of Computing, pp. 169-178, (2009).
"Transparent Data Encryption", Oracle Advanced Security, Oracle Corporation Japan, Internet <URL: http://www.oracle.com/technetwork/ip/database/enterprise-edition/ds-security-advanced-security-11gr2-134506-134506-ja.pdf>, Total 2 Pages, (searched on Jan. 24, 2014).
"Mitsubishi Electric Develops Searchable Encryption Platform Software, Searchable Encryption Platform Software", Mitsubishi Electric Corporation, Total 3 Pages, Internet <URL: http://www.mitsubishielectric.co.jp/news/2013/pdf/0703-a.pdf>, (searched on Jan. 24, 2014).
"IBM Infosphere Optim Data Making solution for Oracle E-Business Suite", IBM Japan Limited, Internet <URL: http://www-06.ibm.com/software/ip/data/optim/solutionbrief/IMS14011_JPJA)01.pdf>, Total 6 Pages, (searched on Jan. 24, 2014).
"Fujitsu Develops World's First Homomorphic Encryption Technology that Enables Statistical Calculations and Biometric Authentication", Fujitsu Laboratories Ltd, Internet <URL: http://pr.fujitsu.com/ip/news/2013/06/28.html>, Total 6 Pages, (Aug. 28, 2013).
"NEC Develops World's First Secret Computation Technology that Enables Search over Encrypted Databases", NEC Corporation, Internet <URL: http://ipn.nec.com/press/201311/20131106.html>, Total 5 Pages, (Nov. 6, 2013), (with English Translation).
Jun Furukawa, "Request-Based Comparable Encryption", ESORICS 2013, LNCS 8134, pp. 129-146, (2013).
Jun Furukawa, et al., "Controlled Joining on Encrypted Relational Database", Pairing 2012, LNCS 7708, pp. 46-64, (2013).
Adi Shamir, "How to Share a Secret", Communications of the ACM, vol. 22, Issue 11, pp. 612-613, (Nov. 1979).
Koji Chida, et al., "A Three-Party Secure Function Evaluation with Lightweight Verifiability Revisited", Computer Security Symposium 2010, Total 6 Pages, (2010), (with English Abstract).
Koji Chida, et al., "A Secure Matching Protocol with Statistical Disclosure Control", IPSJ SIG Technical Report, 2011-CSEC-52(12), (2011), Total 6 Pages, (with English Abstract).
Koki Hamada, et al., "A Linear Time Sorting Algorithm on Secure Function Evaluation", Computer Security Symposium 2011, Total 7 Pages, (Jan. 25-28, 2011), with corresponding English version entitled: "Oblivious Radix Sort: An Efficient Sorting Algorithm for Practical Secure Multi-party Computation", Total 19 Pages.
Rvo Kikuchi, et al., "Unconditionally Secure Password-Based Authentication for Multiparty Systems", Computer Security Symposium 2013, pp. 435-442, (Oct. 21-23, 2013), (with English Abstract).
"The R Project for Statistical Computing", The R Project, Internet <URL: http://www.r-project.org/index.html>, Total 1 Page, (searched on Jan. 14, 2014).
International Search Report dated Mar. 10, 2015 in PCT/JP14/082220 Filed Dec. 5, 2014.
Combined Chinese Office Action and Search Report dated Aug. 20, 2018, in Patent Application No. 201480074049.X (with English translation), 20 pages.

* cited by examiner

SECURE COMPUTATION METHOD, SECURE COMPUTATION SYSTEM, SECURE COMPUTATION SERVER, REGISTRANT TERMINAL, USER TERMINAL AND PROGRAM

TECHNICAL FIELD

The present invention relates to cryptographic use techniques, and more specifically, to a secure computation technique of performing function calculation or statistical processing without revealing input data.

BACKGROUND ART

Recently, privacy protection in compliance with the Personal Information Protection Law or the like has become more important. For example, in data mining utilizing big data, development of new drugs prescribed for rare diseases, statistical analyses including utilization of information obtained by a national census for state planning or the like, there is an increasing demand for processing data while concealing personal information. However, the stored precious data is often placed under security control and cannot be utilized effectively in market analysis and statistical analysis for planning, which are highly demanded, and the data is simply stored and remains a record.

One possible approach to the utilization of information while keeping personal information secret is to physically isolate a database including personal information and to perform a manual operation to allow access to necessary information. Techniques that can be considered include deleting items related to personal information from a database, encoding data when it is stored and decoding it to plaintext when it is manipulated, performing a manual access control operation to grant access rights only to the system administrator or the like, and to mask personal information so that individuals cannot be identified.

Techniques intended to perform function calculation or statistical processing while concealing personal information by using the approaches indicated above include those described in Non-patent literature 1 to 9, for example.

PRIOR ART LITERATURE

Non-Patent Literature

Non-patent literature 1: Dan Bogdanov, Margus Niitsoo, Tomas Toft, and Jan Willemson, "High-performance secure multi-party computation for data mining applications", International Journal of Information Security, vol. 11, issue 6, pp. 403-418, 2012

Non-patent literature 2: Martin Burkhart, Mario Strasser, Dilip Many, and Xenofontas Dimitropoulos, "SEPIA: Privacy-Preserving Aggregation of Multi-Domain Network Events and Statistics", USENIX Security, 2010

Non-patent literature 3: Raluca Ada Popa, Catherine M. S. Redfield, Nickolai Zeldovich, Hari Balakrishnan, "CryptDB: Protecting Confidentiality with Encrypted Query Processing", SOSP '11 Proceedings of the Twenty-Third ACM Symposium on Operating Systems Principles, pp. 85-100, 2011

Non-patent literature 4: Craig Gentry, "Fully Homomorphic Encryption Using Ideal Lattices", STOC '09 Proceedings of the 41st annual ACM symposium on Theory of computing, pp. 169-178, 2009

Non-patent literature 5: Oracle Corporation Japan, "Oracle Advanced Security", [online], [searched on Jan. 24, 2014], Internet <URL: http://www.oracle.com/technetwork/jp/database/enterprise-edition/ds-security-advanced-security-11gr2-134506-ja.pdf>

Non-patent literature 6: Mitsubishi Electric Corporation, "Searchable Encryption Platform Software", [online], [searched on Jan. 24, 2014], Internet <URL: http://www.mitsubishielectric.co.jp/news/2013/pdf/0703-a.pdf>

Non-patent literature 7: IBM Japan Limited, "IBM InfoSphere Optim Data Masking Solution for Oracle E-Business Suite", [online], [searched on Jan. 24, 2014], Internet <URL: http://www-06.ibm.com/software/jp/data/optim/solution-brief/IMS14011_JPJA_01.pdf>

Non-patent literature 8: Fujitsu Laboratories Ltd., "Fujitsu Develops World's First Homomorphic Encryption Technology that Enables Statistical Calculations and Biometric Authentication", [online], [searched on Jan. 24, 2014], Internet <URL: http://pr.fujitsu.com/ip/news/2013/08/28.html>

Non-patent literature 9: NEC Corporation, "NEC Develops World's First Secret Computation Technology that Enables Search over Encrypted Databases", [online], [searched on Jan. 24, 2014], Internet <URL: http://jpn.nec.com/press/201311/20131106 01.html>

SUMMARY OF THE INVENTION

Problems to be Solved by the Invention

The utilization of information while concealing personal information by the conventional approaches includes the following problems. In the technique of deleting personal information from a database, if the total number of data items is small, as in the analysis of a rare disease, an individual can be inferred from a value other than the personal information, and the security is not ensured. The technique of encoding data when it is stored needs decoding to plaintext when the data is manipulated and cannot eliminate the possibility of an information leak. The technique of performing a manual operation to perform access control has a risk that information will be leaked by unauthorized access from the inside. The technique of masking data cannot recover the data once it is masked and lacks flexibility to support a variety of statistical analysis demands.

An object of the present invention is to provide a secure computation technique that enables various types of data processing while keeping personal information included in the data concealed and leaving it unrecovered.

Means to Solve the Problems

To solve the above-described problems, the present invention provides a secure computation method, wherein n≥k is satisfied, where n and k are integers not less than 2; and storages of n secure computation servers store n registered password shared values obtained by splitting a registered password of an informant and n utilization password shared values obtained by splitting a utilization password of an information analyst. The secure computation method includes: a registration authentication request step in which an authentication request section of a registrant terminal allocates, to the n secure computation servers, n registration input password shared values obtained by splitting a registration input password input by the informant; a registration authentication execution step in which authentication execution sections of at least k of the n secure computation servers verify whether the registration input password agrees with the registered password, by using the registration input password shared values and the registered password shared values; a secret sharing step in which a secret sharing section of the registrant terminal splits target data input by the informant to generate n data shared values; a registration request step in which a registration request section of the registrant terminal allocates the data shared values to the n secure computation servers; a registration execution step in which registration execution sections of the n secure computation servers store the data shared values in the storages; a utilization authentication request step in which an authentication request section of a user terminal allocates, to the n secure computation servers, n utilization input password shared values obtained by splitting a utilization input password input by the information analyst; a utilization authentication execution step in which authentication execution sections of at least k of the n secure computation servers verify whether the utilization input password agrees with the utilization password, by using the utilization input password shared values and the utilization password shared values; a computation request step in which a computation request section of the user terminal sends a data processing request for the target data to the n secure computation servers; a secure computation step in which secure computation sections of at least k of the n secure computation servers execute secure computation of the data shared values in accordance with the data processing request to generate n processing result shared values, which are obtained by splitting a processing result obtained by executing requested data processing on the target data; and a result recovering step in which a result recovering section of the user terminal recovers the processing result from, out of the processing result shared values, at least k processing result shared values received from the at least k of the n secure computation servers.

Effects of the Invention

According to the present invention, various types of data processing can be performed while leaving personal information included in the data concealed and unrecovered.

DETAILED DESCRIPTION OF THE EMBODIMENTS

Figure 1:
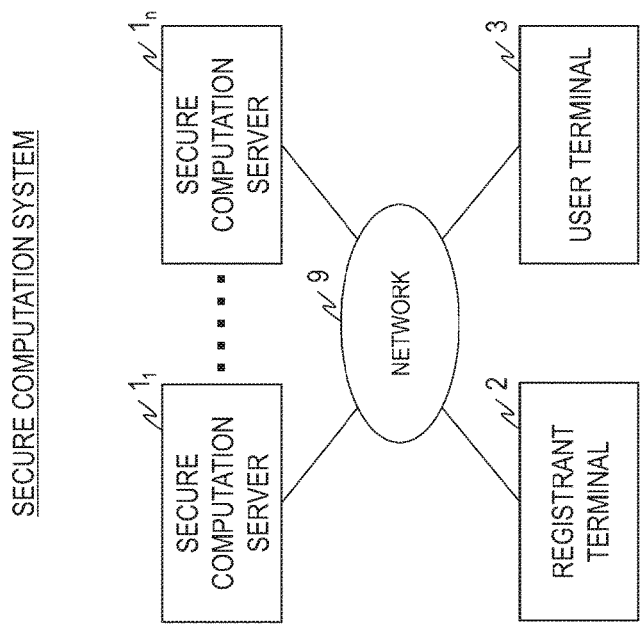
FIG. 1 is a view showing an example of the functional configuration of a secure computation system.

Prior to a description of an embodiment, the basic technical concepts used in the present invention will be described.

Secret Sharing Technique

Secret sharing is a technique of converting data into a plurality of shared values, allowing the original data to be recovered when a specified number of shared values or more is used, and disallowing recovery of the original data when the number of shared values is less than the specified number. A (k, n) secret sharing is a type of secret sharing in which input plaintext is split into n shared values, the n shared values are given to n calculation entities, the plaintext can be recovered if k shared values are combined, and no information of the plaintext can be obtained from fewer-than-k shared values, where n and k are integers not less than 1 and satisfy n≥k. A typical example of (k, n) secret sharing is Shamir secret sharing, which is described in A. Shamir, "How to share a secret", Communications of the ACM, Volume 22, Issue 11, pp. 612-613, 1979 (Reference literature 1). Any type of secret sharing scheme that allows use of the secure computation and secure computation-based authentication to be described below can be used in the present invention.

Secure Computation Technique

Secure computation is a technique in which the data to be calculated is split and saved on a plurality of calculation entities, and shared values of a function value of the original data are calculated in cooperation with another calculation entity without recovering the original data. Secure computation uses secret sharing as an underlying technology.

Secure computation used in the present invention should be a technique in which various types of computations required for desired data processing can be applied to shared values generated by a specific secret sharing scheme. A secure computation technique for performing basic computations such as addition and multiplication of shared values is described in Koji Chida, Koki Hamada, Dai Ikarashi, and Katsumi Takahashi, "A Three-Party Secure Function Evaluation with Lightweight Verifiability Revisited", Computer Security Symposium 2010, 2010 (Reference literature 2), for example. A secret matching technique for performing a search based on shared values of a data string with information left concealed is described in Koji Chida, Masayuki Terada, Takayasu Yamaguchi, Dai Ikarashi, Koki Hamada, and Katsumi Takahashi, "A Secure Matching Protocol with Statistical Disclosure Control", IPSJ SIG Technical Report, 2011-CSEC-52(12), 2011 (Reference literature 3), for example. A secret sorting technique for sorting shared values of a data string while being left concealed is described in Koki Hamada, Dai Ikarashi, Koji Chida, and Katsumi Takahashi, "A linear time sorting algorithm on secure function evaluation", Computer Security Symposium 2011, 2011 (Reference literature 4), for example.

Secure Computation-Based Authentication Technique

Secure computation-based authentication is a technique in which authentication information, such as a log-in or a password, is split to and saved on a plurality of calculation entities, and, without recovering the authentication information, whether authentication information input by a user is correct or not is verified in cooperation with another calculation entity.

The present invention allows any secure computation-based authentication scheme to be used. For example, a secure computation-based authentication scheme described in Ryo Kikuchi, Dai Ikarashi, Koji Chida, and Koki Hamada, "Unconditionally Secure Password-Based Authentication for Multiparty Systems", Computer Security Symposium 2013, 2013 (Reference literature 5) can be used.

An embodiment of the present invention will be described below in detail. In the drawings, components having identical functions will be denoted by the same reference numerals, and overlaps in the descriptions will be avoided.

Embodiment

Referring to FIG. 1, an example configuration of a secure computation system according to an embodiment will be described. The secure computation system includes n secure computation servers $1_1$ to $1_n$ (n≥2), at least one registrant terminal 2, at least one user terminal 3, and a network 9. The secure computation servers $1_1$ to $1_n$, the registrant terminal 2, and the user terminal 3 are separately connected to the network 9. The network 9 should be configured to allow mutual communication between the secure computation servers $1_1$ to $1_n$, between the secure computation servers $1_1$ to $1_n$ and the registrant terminal 2, and between the secure computation servers $1_1$ to $1_n$ and the user terminal 3, and can be configured, for example, by the Internet, a LAN, or a WAN. It is preferred that highly confidential communication be implemented by cryptographic technology or the like on the communication channels between the secure computation servers $1_1$ to $1_n$. Online communication capability through the network 9 is not necessarily required between the secure computation servers $1_1$ to $1_n$, the registrant terminal 2, and the user terminal 3. For example, information output from the registrant terminal 2 may be stored in a portable recording medium, such as a USB memory, and may be input off-line from the portable recording medium to any secure computation server $1_i$ (1≤i≤n).

Figure 2:
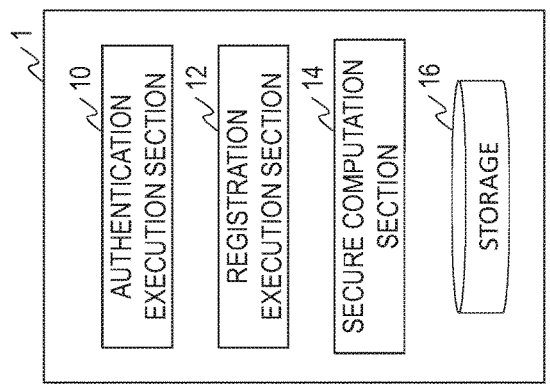
FIG. 2 is a view showing an example of the functional configuration of a secure computation server.

Referring to FIG. 2, an example configuration of the secure computation server $1_i$ (i=1 to n) included in the secure computation system will be described. The secure computation server $1_i$ includes an authentication execution section 10, a registration execution section 12, a secure computation section 14, and a storage 16. The secure computation server $1_i$ is, for example, a special apparatus configured by reading a special program into a known or special computer having a central processing unit (CPU), a main memory (a random access memory or RAM), and other components. The secure computation server $1_i$ executes processing under the control of the central processing unit, for example. Data input to the secure computation server $1_i$ or data obtained by processing is stored in the main memory, for example, and the data stored in the main memory is read and used for other processing when necessary. The storage 16 can be configured by a main memory such as a random access memory (RAM); an auxiliary memory including a hard disk, an optical disc, or a semiconductor memory device such as a flash memory; or middleware such as a relational database or a key-value store.

Figure 3:
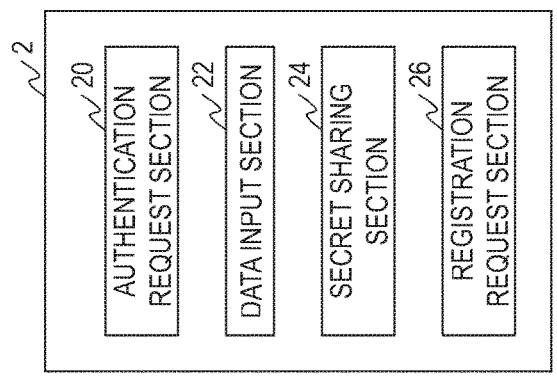
FIG. 3 is a view showing an example of the functional configuration of a registrant terminal.

Referring to FIG. 3, an example configuration of the registrant terminal 2 included in the secure computation system will be described. The registrant terminal 2 includes an authentication request section 20, a data input section 22, a secret sharing section 24, and a registration request section 26. The registrant terminal 2 is, for example, a special apparatus configured by reading a special program into a known or special computer having a central processing unit (CPU), a main memory (a random access memory or RAM), and other components. The registrant terminal 2 executes processing under the control of the central processing unit, for example. Data input to the registrant terminal 2 or data obtained by processing is stored in the main memory, for example, and the data stored in the main memory is read and used for other processing when necessary. The registrant terminal 2 is specifically a desktop or laptop personal computer, a mobile phone, a smartphone, a tablet terminal, or the like.

Figure 4:
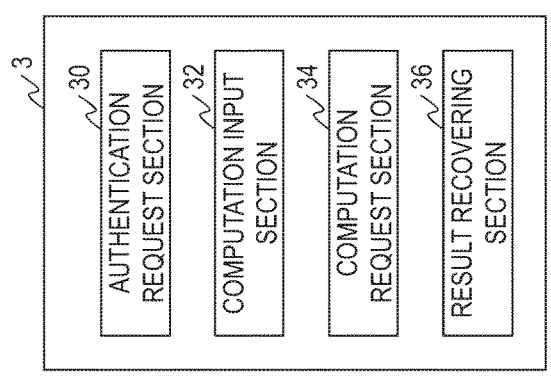
FIG. 4 is a view showing an example of the functional configuration of a user terminal.

Referring to FIG. 4, an example configuration of the user terminal 3 included in the secure computation system will be described. The user terminal 3 includes an authentication request section 30, a computation input section 32, a computation request section 34, and a result recovering section 36. The user terminal 3 is, for example, a special apparatus configured by reading a special program into a known or special computer having a central processing unit (CPU), a main memory (a random access memory or RAM), and other components. The user terminal 3 executes processing under the control of the central processing unit, for example. Data input to the user terminal 3 or data obtained by processing is stored in the main memory, for example, and the data stored in the main memory is read and used for other processing when necessary. The user terminal 3 is specifically a desktop or laptop personal computer, a mobile phone, a smartphone, a tablet terminal, or the like.

Figure 5:
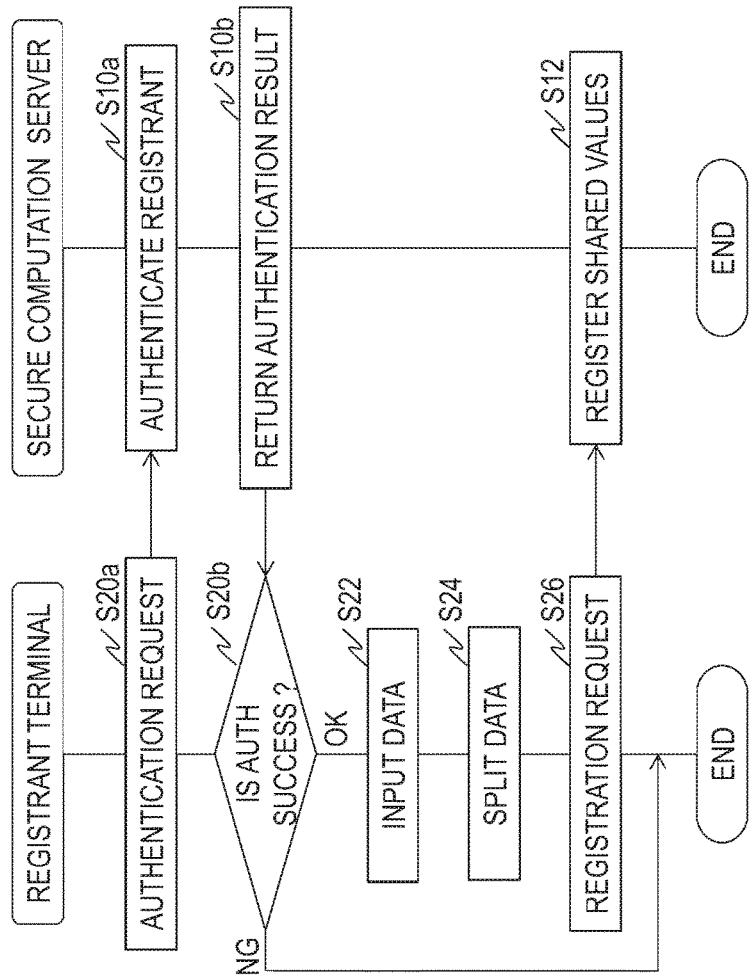
FIG. 5 is a view showing an example processing flow of a secure computation method.
Figure 6:
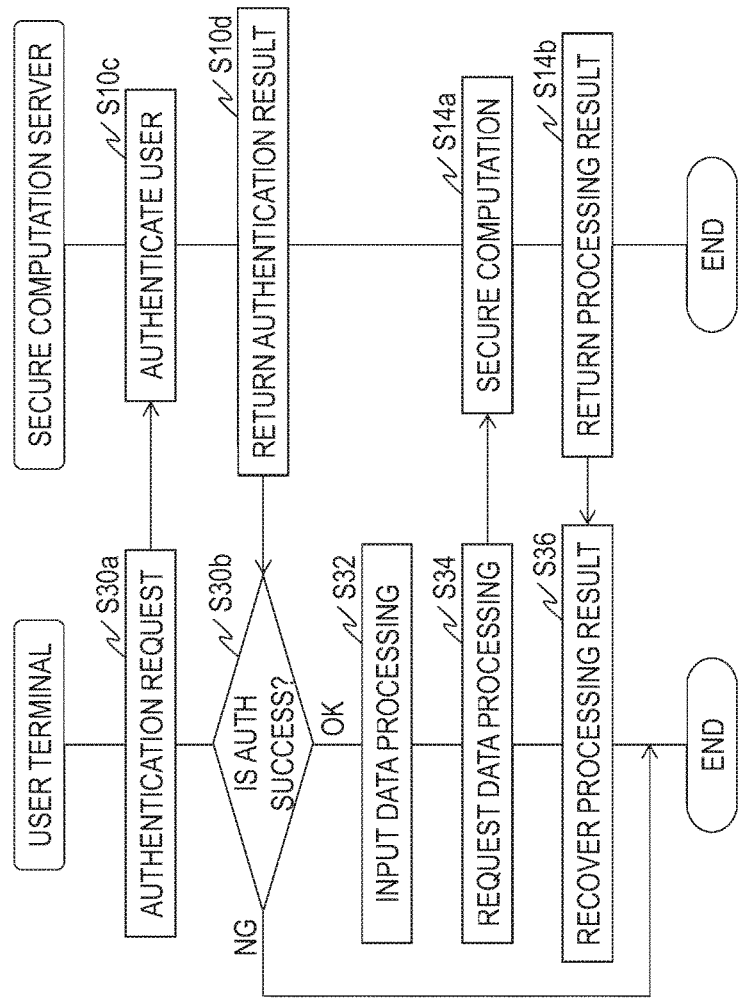
FIG. 6 is a view showing an example processing flow of the secure computation method.

Referring to FIGS. 5 and 6, an example processing flow of a secure computation method executed by the secure computation system according to the embodiment will be described, following the procedures described below. FIG. 5 illustrates a procedure in which the registrant terminal 2 registers target data for data processing in the secure computation servers $1_1$ to $1_n$.

The storage 16 of the secure computation server $1_i$ (i=1 to n) stores an i-th shared value of n shared values obtained by splitting a password specified for an informant using the registrant terminal 2 or an information analyst using the user terminal 3. Hereafter, the password of the informant will be referred to as a registered password, and n shared values obtained by splitting the registered password will be referred to as registered-password shared values. The password of the information analyst will be referred to as a utilization password, and n shared values obtained by splitting the utilization password will be referred to as utilization-password shared values. The method of sharing the password needs to be a secret sharing scheme that can use the secure computation-based authentication technique described earlier. For example, the secret sharing scheme described in Reference literature 5, described above, can be applied.

In step S20a, the authentication request section 20 of the registrant terminal 2 allocates, to the n secure computation servers $1_1$ to $1_n$, n shared values obtained by splitting a password input by the informant. Hereafter, the password input by the informant will be referred to as a registration input password, and n shared values obtained by splitting the registration input password will be referred to as registration input password shared values. To allocate means to send an i-th registration input password shared value, where i is an integer between 1 and n, both inclusive, to an i-th secure computation server $1_i$ through the communication channel.

In step S10a, the authentication execution section 10 of the secure computation server $1_i$ verifies whether the registration input password agrees with the registered password, by using the registration input password shared value received from the registrant terminal 2 and the registered password shared value stored in the storage 16. At least k of the n secure computation servers $1_1$ to $1_n$ should work in cooperation with one another to execute step S10a. For a specific password verification method, refer to Reference literature 4, described above.

In step S10b, if it is determined that the registration input password agrees with the registered password, the authentication execution section 10 of the secure computation server $1_i$ sends to the registrant terminal 2 the result of authentication indicating that authentication has been successful. If it is determined that the registration input password does not agree with the registered password, the result of authentication indicating that authentication has failed is sent to the registrant terminal 2.

In step S20b, if the result of authentication received from the secure computation server $1_i$ indicates that the authentication has failed, the authentication request section 20 of the registrant terminal 2 ends the processing. If the result of authentication received from the secure computation server $1_i$ indicates that the authentication has been successful, the processing proceeds to step S22. The results of authentication are received from at least k secure computation servers 1, and it is determined that the authentication has failed unless all the results of authentication indicate that the authentication has been successful.

In step S22, the target data for data processing is input to the data input section 22 of the registrant terminal 2. The target data includes personal information with which an individual can be identified. The personal information is, for example, information representing attributes of an individual such as the name, address, date of birth, and sex. Items required for the purpose of data processing are specified for the information other than the personal information in the target data.

In step S24, the secret sharing section 24 of the registrant terminal 2 generates n data shared values by splitting the target data. The method of sharing the target data needs to be a secret sharing scheme that can use the secure computation technique described earlier. For example, the secret sharing scheme described in any of Reference literature 2 to 4, described above, can be applied. The target data, including items corresponding to the personal information and items other than the personal information, is split as a whole.

In step S26, the registration request section 26 of the registrant terminal 2 allocates the data shared values to the n secure computation servers $1_1$ to $1_n$. To allocate means to send an i-th data shared value, where i is an integer between 1 and n, both inclusive, to an i-th secure computation server $1_i$ through the communication channel.

In step S12, the registration execution sections 12 of the secure computation servers $1_1$ to $1_n$ store in the storages 16 the data shared values received from the registrant terminal 2.

Referring to FIG. 6, a procedure for performing data processing required by the user terminal 3, by using the shared values of the target data registered in the secure computation servers $1_1$ to $1_n$, will be described.

In step S30a, the authentication request section 30 of the user terminal 3 allocates, to the n secure computation servers $1_1$ to $1_n$, n shared values obtained by splitting a password input by the information analyst. Hereafter, the password input by the information analyst will be referred to as a utilization input password, and n shared values obtained by splitting the utilization input password will be referred to as utilization input password shared values. To allocate means to send an i-th utilization input password shared value, where i is an integer between 1 and n, both inclusive, to an i-th secure computation server $1_i$ through the communication channel.

In step S10c, the authentication execution section 10 of the secure computation server $1_i$ verifies whether the utilization input password agrees with the utilization password by using the utilization input password shared value received from the user terminal 3 and the utilization-password shared value stored in the storage 16. At least k of the n secure computation servers $1_1$ to $1_n$, should work in cooperation with one another to execute step S10c. For a specific password verification method, refer to Reference literature 5, described above.

In step S10d, if it is determined that the utilization input password agrees with the utilization password, the authentication execution section 10 of the secure computation server $1_i$ sends to the user terminal 3 the result of authentication indicating that the authentication has been successful. If it is determined that the utilization input password does not agree with the utilization password, the result of authentication indicating that the authentication has failed is sent to the user terminal 3.

In step S30b, if the result of authentication received from the secure computation server $1_i$ indicates that the authentication has failed, the authentication request section 30 of the user terminal 3 ends the processing. If the result of authentication received from the secure computation server $1_i$ indicates that the authentication has been successful, the processing proceeds to step S32. The results of authentication are received from at least k secure computation servers 1, and it is determined that the authentication has failed unless all the results of authentication indicate that the authentication has been successful.

In step S32, a data processing request describing the content of data processing performed on the target data is input to the computation input section 32 of the user terminal 3. The data processing request is a script described in a programming language specified beforehand, for example. Specifically, the R language developed for statistical analysis in an open-source project or the like can be used. For details of the R language, refer to The R Project, "The R Project for Statistical Computing", [online], [searched on Jan. 14, 2014], Internet <URL: http://www.r-project.org/index.html> (Reference literature 6). The data processing request can include sort processing for sorting the target data and matching processing for extracting data matching a condition from the target data, as well as basic computations such as addition and multiplication.

In step S34, the computation request section 34 of the user terminal 3 sends the data processing request to the n secure computation servers $1_1$ to $1_n$. Any transmission path can be used so long as all of the n secure computation servers $1_1$ to $1_n$ can receive the data processing request. For example, the user terminal 3 can send the request individually to all of the n secure computation servers $1_1$ to $1_n$, or alternatively, the user terminal 3 can send it to any one secure computation server $1_i$, and the secure computation server $1_i$ can transfer it to another secure computation server $1_j$ (j=1 to n, i≠j).

In step S14a, the secure computation sections 14 of secure computation servers $1_i$ execute secure computation of the data shared values stored in the storages 16 in accordance with the data processing request received from the user terminal 3 to generate n shared values, which are obtained by splitting the processing result obtained by executing the requested data processing on the target data, into n pieces. Hereafter, n shared values obtained by splitting the processing result will be referred to as processing result shared values. In step S14a, at least k of the n secure computation servers $1_1$ to $1_n$ should work in cooperation with one another.

In step S14b, the secure computation section 14 of the secure computation server $1_i$ sends the processing result shared value to the user terminal 3.

In step S36, the result recovering section 36 of the user terminal 3 recovers the processing result from the processing result shared values received from secure computation servers $1_i$. It is not required to receive the processing result shared values from all of the n secure computation servers $1_1$ to $1_n$; the processing result can be recovered if k or more processing result shared values are received from at least k secure computation servers 1.

As described above, the secure computation technique according to the present invention performs secure authentication by secure computation-based authentication; then performs data processing, such as statistical analysis and searching, on the shared values while concealing personal information, the shared values being obtained through secret sharing of the entire target data by the registrant terminal; and returns shared values of the processing result to the user terminal. This makes it possible to perform various types of data processing in the secure computation servers while leaving personal information included in the target data and the processing result concealed and unrecovered.

Comparison with Conventional Art

The secure computation technique described in Non-patent literature 1 has some problems, including the following: Sort processing necessary for statistical analysis cannot be performed; since a special language compiler is used, information processing extensibility is low; and the number of calculation nodes is fixed. The secure computation technique according to the present invention allows sort processing to be used while information is kept secret, allows a general-purpose programming language to be used, and provides a variable number of calculation nodes.

The secure computation technique described in Non-patent literature 2 has some problems such as low basic computation capability, lack of sort processing capability, and lack of program extensibility. The secure computation technique according to the present invention allows sort processing to be used while information is kept secret and allows a general-purpose programming language to be used. The basic computation capability of the secure computation technique described in Non-patent literature 2 is as low as eighty thousand multiplications per second, but the basic computation capability of the secure computation technique according to the present invention is as high as one million multiplications per second.

The secure computation technique described in Non-patent literature 3 implements sorting in an encrypted state obtained by using a plurality of codes hierarchically, but the types of computations that can be processed are limited. There is also a problem that the sequential relationships become inferable as a number of processing is performed. With the secure computation technique according to the present invention, a variety of computations such as sort processing and matching processing can be performed, and since secret sharing allows sort processing to be performed while information is kept concealed, a high level of security is achieved.

The secure computation technique described in Non-patent literature 4 uses fully homomorphic encryption to allow any computation in an encrypted state, but the execution speed is low and the practicality is low. The secure computation technique according to the present invention has a high basic computation capability as described earlier.

The secure computation technique described in Non-patent literature 5 encrypts a database but requires recovery of the encrypted data for data processing. The secure computation technique according to the present invention can execute all computations while leaving the information concealed and unrecovered.

The secure computation technique described in Non-patent literature 6 allows a search to be performed without decoding data, but data-providing entities need to share a secret key, and confidentiality is not ensured. The secure computation technique according to the present invention conceals information by secret sharing, which does not use a secret key, and consequently ensures a high level of security.

The secure computation technique described in Non-patent literature 7 can mask personal information or confidential information while maintaining the meaning of data, but since information other than the personal information is handled as plaintext, it is difficult to use the technique in specific fields where sensitive data is handled, such as medical care and administration. Since the secure computation technique according to the present invention performs secret sharing of the entire target data including information other than personal information, even if the number of target data items is small, it is difficult to infer an individual from the information other than the personal information.

The secure computation technique described in Non-patent literature 8 can perform statistical processing for obtaining a mean value, a standard deviation, and a sum through logical operations performed by a single server, but since sort processing cannot be performed, a maximum value, a minimum value, or a median value cannot be obtained in the statistical processing, and the extensibility is low. Another problem is that the basic computation capability is low. The secure computation technique according to the present invention allows sort processing to be used while information is kept secret, and consequently a maximum value, a minimum value, and a median value can be obtained. The secure computation technique of the present invention has a high basic computation capability, as described earlier.

The secure computation technique described in Non-patent literature 9 can perform data processing while a relational database is left encrypted, but a part of the computation must be executed on the client side. The technique has another problem of low information processing extensibility due to the varying encryption methods of individual computations. The secure computation technique according to the present invention performs secure computation just by secure computation servers, and the user terminal and other devices are not involved in data processing. All computations are performed by using shared values obtained through secret sharing by a specific secret sharing technique, and therefore the degree of flexibility in design of data processing content is high.

The present invention is not limited to the above described embodiment, and appropriate changes can be made to the above embodiment without departing from the scope of the present invention. Each type of processing described in the embodiment may be executed not only time sequentially according to the order of description but also in parallel or individually when necessary or according to the processing capabilities of the apparatuses that execute the processing.

Program and Recording Medium

When various types of processing functions in each apparatus, described in the embodiment, are implemented by a computer, the processing details of the functions that should be provided by each apparatus are described in a program. When the program is executed by a computer, the processing functions in each apparatus are implemented on the computer.

The program containing the processing details can be recorded in a computer-readable recording medium. The computer-readable recording medium can be any type of medium, such as a magnetic storage device, an optical disc, a magneto-optical recording medium, or a semiconductor memory.

This program is distributed by selling, transferring, or lending a portable recording medium such as a DVD or a CD-ROM with the program recorded on it, for example. The program may also be distributed by storing the program in a storage of a server computer and transferring the program from the server computer to another computer through the network.

A computer that executes this type of program first stores the program recorded on the portable recording medium or the program transferred from the server computer in its storage. Then, the computer reads the program stored in its storage and executes processing in accordance with the read program. In a different program execution form, the computer may read the program directly from the portable recording medium and execute processing in accordance with the program, or the computer may execute processing in accordance with the program each time the computer receives the program transferred from the server computer. Alternatively, the above-described processing may be executed by a so-called application service provider (ASP) service, in which the processing functions are implemented just by giving program execution instructions and obtaining the results without transferring the program from the server computer to the computer. The program of this form includes information that is provided for use in processing by the computer and is treated correspondingly as a program (something that is not a direct instruction to the computer but is data or the like that has characteristics that determine the processing executed by the computer).

In the description given above, the apparatuses are implemented by executing the predetermined programs on the computer, but at least a part of the processing details may be implemented by hardware.

What is claimed is:

1. A secure computation method,
wherein n>k is satisfied, where n and k are integers not less than 2; and
storages of n secure computation servers store n registered password shared values obtained by splitting a registered password of an informant and n utilization password shared values obtained by splitting a utilization password of an information analyst;
the secure computation method comprising:
a registration authentication request step in which an authentication request section of a registrant terminal allocates, to the n secure computation servers, n registration input password shared values obtained by splitting a registration input password input by the informant;
a registration authentication execution step in which authentication execution sections of at least k of the n secure computation servers verify whether the registration input password agrees with the registered password, by using the registration input password shared values and the registered password shared values;
a registration authentication result examination step in which the authentication request section of the registrant terminal receives authentication results that are results of verifying whether or not the registration input password agrees with the registered password from the at least k of the n secure computation servers, and judges to be authentication success only when all of the authentication results indicate authentication success;
a secret sharing step in which a secret sharing section of the registrant terminal splits target data input by the informant to generate n data shared values;
a registration request step in which a registration request section of the registrant terminal allocates the data shared values to the n secure computation servers;
a registration execution step in which registration execution sections of the n secure computation servers store the data shared values in the storages;
a utilization authentication request step in which an authentication request section of a user terminal allocates, to the n secure computation servers, n utilization input password shared values obtained by splitting a utilization input password input by the information analyst;
a utilization authentication execution step in which authentication execution sections of at least k of the n secure computation servers verify whether the utilization input password agrees with the utilization password, by using the utilization input password shared values and the utilization password shared values;
a computation request step in which a computation request section of the user terminal sends a data processing request for the target data to the n secure computation servers;
a secure computation step in which secure computation sections of at least k of the n secure computation servers execute secure computation of the data shared values in accordance with the data processing request to generate n processing result shared values, which are obtained by splitting a processing result obtained by executing requested data processing on the target data; and
a result recovering step in which a result recovering section of the user terminal recovers the processing result from, out of the processing result shared values, at least k processing result shared values received from the at least k of the n secure computation servers.

2. The secure computation method according to claim 1, wherein the target data includes personal information with which an individual can be identified; and
in the secret sharing step, the data shared values are generated by splitting the entire target data altogether.

3. The secure computation method according to claim 2, wherein the data processing request includes sort processing for sorting the target data and/or matching processing for extracting data matching a condition from the target data; and
in the secure computation step, the processing result shared values are generated by executing secret sort calculation and/or secret matching calculation on the data shared values.

4. The secure computation method according to claim 1, wherein the data processing request includes sort processing for sorting the target data and/or matching processing for extracting data matching a condition from the target data; and
in the secure computation step, the processing result shared values are generated by executing secret sort calculation and/or secret matching calculation on the data shared values.

5. A secure computation system comprising n secure computation servers, at least one registrant terminal, and at least one user terminal, wherein n>k is satisfied, where n and k are integers not less than 2;
the registrant terminal comprising:
an authentication request section adapted to allocate, to the n secure computation servers, n registration input password shared values obtained by splitting a registration input password input by an informant, to receive authentication results that are results of verifying whether or not a registration input password agrees with a registered password from at least k of the n secure computation servers, and to judge to be authentication success only when all of the authentication results indicate authentication success;

a secret sharing section adapted to generate n data shared values by splitting target data input by the informant; and a registration request section adapted to allocate the data shared values to the n secure computation servers;

the user terminal comprising:

an authentication request section adapted to allocate, to the n secure computation servers, n utilization input password shared values obtained by splitting a utilization input password input by an information analyst;

a computation request section adapted to send a data processing request for the target data to the n secure computation servers; and a result recovering section adapted to recover a processing result from at least k processing result shared values received from the secure computation servers, out of n processing result shared values obtained by splitting the processing result obtained by executing requested data processing on the target data; and the secure computation servers comprising:

storages adapted to store n registered password shared values obtained by splitting a registered password of the informant and n utilization password shared values obtained by splitting a utilization password of the information analyst;

authentication execution sections adapted to verify whether the registration input password agrees with the registered password, by using the registration input password shared values and the registered password shared values when the registration input password shared values are received, and to verify whether the utilization input password agrees with the utilization password, by using the utilization input password shared values and the utilization password shared values when the utilization input password shared values are received;

registration execution sections adapted to store the data shared values in the storages; and secure computation sections adapted to execute secure computation of the data shared values in accordance with the data processing request to generate the processing result shared values.

6. A registrant terminal comprising, wherein n is integer not less than 2:

an authentication request section adapted to allocate, to n secure computation servers, n registration input password shared values obtained by splitting a registration input password input by an informant, to receive authentication results that are results of verifying whether or not a registration input password agrees with a registered password from at least k of the n secure computation servers, and to judge to be authentication success only when all of the authentication results indicate authentication success;

a secret sharing section adapted to generate n data shared values by splitting target data input by the informant; and a registration request section adapted to allocate the data shared values to the n secure computation servers.

7. A non-transitory computer readable medium including computer executable instructions that make a computer function as the registrant terminal according to claim 6.

* * * * *